(12) United States Patent
Caldwell (10) Patent No.: US 6,722,020 B2
(45) Date of Patent: Apr. 20, 2004

(54) WORKPIECE TABLE ASSEMBLY

(75) Inventor: Raymond E. Caldwell, Henagar, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 320 days.

(21) Appl. No.: 09/955,497

(22) Filed: Sep. 17, 2001

(65) Prior Publication Data

US 2003/0051334 A1 Mar. 20, 2003

(51) Int. Cl.[7] .................................................. H01F 7/06
(52) U.S. Cl. ............................. 29/606; 29/729; 29/736; 29/742; 29/281.1; 29/281.2; 29/283.5; 269/55; 269/71; 269/295; 269/309; 269/903; 310/208
(58) Field of Search .......................... 29/596, 606, 729, 29/736, 742, 748, 755, 760, 759, 281.1, 281.2, 281.5, 283.5; 310/208; 269/55, 71, 295, 309, 903

(56) References Cited

U.S. PATENT DOCUMENTS

| | | | | |
|---|---|---|---|---|
| 3,154,112 A | * | 10/1964 | St. Jacques | 140/71 R |
| 3,614,497 A | * | 10/1971 | Brenner | 310/213 |
| 4,329,764 A | * | 5/1982 | Sakaue et al. | 29/33 F |
| 5,970,832 A | * | 10/1999 | Aizawa | 83/76.1 |

FOREIGN PATENT DOCUMENTS

| | | | | |
|---|---|---|---|---|
| JP | | 62126844 A | * 6/1987 | H02K/15/12 |

OTHER PUBLICATIONS

"Turbine generator stator slot thermal conductivity"; Miller, M.L.; Electrical Insulation Conference and Electrical Manufacturing & Coil Winding Conference, 1999. Proceedings, Oct. 26–28 1999; pp.: 65–69.*

* cited by examiner

Primary Examiner—A. Dexter Tugbang
Assistant Examiner—Paul D Kim (57) ABSTRACT

A workpiece table assembly is configured to hold a plurality of workpieces (e.g. conductive strands) so that the workpieces can be modified (e.g. bent). In one embodiment, the workpiece table assembly advantageously comprises a table, a saddle, a lift mechanism, and a die. The saddle is advantageously recessed below the table and raised or lowered by the lift mechanism. The table advantageously has a top surface with holes adapted to accept quick-release pins from a step-off board. The step-off board also has notches to accept and position the strands for die pressing. In one exemplary operation, the step-off board is used to stagger the strands over the down-positioned saddle. The saddle is then raised by the lift mechanism and the die placed within the saddle on top of the strands. A force is applied to the die to bend the strands.

26 Claims, 5 Drawing Sheets

WORKPIECE TABLE ASSEMBLY

FIELD OF THE INVENTION

The present invention relates in general to a table assembly adapted to modify a workpiece, and more particularly, to a table assembly adapted to place at least one bend along a length of a stator coil strand used in a turbine generator within a power generation plant.

BACKGROUND OF THE INVENTION

Many power generation plants produce electricity by converting energy (e.g. fossil fuel, nuclear fission, hydraulic head, geothermal heat) into mechanical energy (e.g. rotation of a turbine shaft), and then converting the mechanical energy into electrical energy (e.g. by the principles of electromagnetic induction). These power generation plants typically use a turbine to convert the energy into mechanical energy and a generator to convert the mechanical energy into electrical energy.

One aspect of the above-described power generation scheme involves conductive coils located within longitudinally extending slots of the generator's laminated stator core. Each coil typically comprises a plurality of conductive strands that are transposed along their longitudinal length so that each strand experiences a similar amount of flux within the slots and thus carries a similar amount of electric current.

To transpose the strands, at least one bend is typically placed in each strand. The bent strands are then intermingled to form the stator coil having a certain transposition pattern. Exemplary stator coil transposition patterns are described in U.S. Pat. No. 1,144,252 to Roebel and U.S. Pat. No. 5,323,079 to Nieves, et al.

Placing the bends(s) in the strands, however, is a labor intensive, physically demanding, time consuming, precise and expensive process because, among other reasons, the bend(s) are typically placed at different positions along the longitudinal length of each strand, the bend(s) may have different geometries, and the bends may have different amounts of spacing relative to adjacent bends on that or other strands.

There is thus a need for an apparatus and method to simplify the stator coil manufacturing process and, in particular, to simplify the placement of bends in conductive strands forming a stator coil. There is also a need to decrease the amount of time and labor required to make the coil, and to decrease the amount of manual physical exertion and precision required when making the coil. There is also a need for a table assembly that can impress a configuration, design or form upon a workpiece.

SUMMARY OF THE INVENTION

One aspect of the present invention thus involves a workpiece table assembly comprising: a table having a surface adapted to support at least one workpiece; a saddle adapted to be movable between a first position and a second position, the first position having at least a portion of the saddle recessed below the surface of the table and the second position having at least a portion of the saddle raised above the surface of the table, the saddle further adapted to hold the workpiece; a die adapted to apply a pressure onto the workpiece sufficient to modify the workpiece; and a step-off board having at least one workpeice portion holder positioned at a desired location along the step-off board, each workpiece portion holder sized and configured to at least partially accept a portion of the workpiece and position the workpiece on the table.

Another aspect of the present invention involves a method of modifying a plurality of offset workpieces, comprising: placing a plurality of workpieces on a surface; arranging a step-off board comprising a protrusion adapted to mate with a depression in the surface to engage the step-off board with the surface, the step-off board further comprising a plurality of workpiece portion holders with each workpiece portion holder adapted to at least partially accept a portion of a workpiece and offset the workpiece relative to the other workpieces; and applying a force onto a die operatively engaged with the offset workpieces, the force sufficient to impress the modification onto the offset workpieces.

Another aspect of the present invention involves method of bending a plurality of copper strands for use in a stator coil used in a turbine generator within a power generation plant, comprising: placing a plurality of copper strands on a surface; arranging a step-off board near the surface, the step-off board having a plurality of notches, each notch adapted to at least partially accept an end of the coil and stagger the coil relative to the other coils; and bending the strands by applying a force onto a die operatively engaged with the offset coils.

Further aspects, features and advantages of the present invention will become apparent from the drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENTS

The invention described herein employs several basic concepts. For example, one concept relates to an apparatus and method used to simplify the stator coil manufacturing process and, in particular, to simplify the placement of bends in conductive strands forming a stator coil. Another concept relates to a table assembly that can impress at least one configuration, design or form upon a workpiece.

The present invention is disclosed in context of an exemplary stator coil table assembly and stator coil manufacturing process. The principles of the present invention, however, are not limited to stator coil table assemblies or to stator coil manufacturing processes, and can be used in connection with a wide variety of other table assemblies and manufacturing processes, especially those involving assembly-line type operations. The principles of the present invention can be similarly used in connection with a wide variety of workpieces that require at least one configuration, design or form to be impressed thereupon, especially those having at least one elongated or partially elongated length. One skilled in the art may also find additional applications for the apparatus, components, configurations and methods disclosed herein. Thus, the illustration and description of the present invention in context of an exemplary stator coil table assembly and a stator coil manufacturing process is merely one possible application of the present invention.

A contextual overview of an exemplary embodiment of the present invention is provided, followed by a more detailed description. Referring to FIGS. 3, 5, 6 and 8, a workpiece table assembly 10 is configured to hold a plurality of individual wire strands 12 so that the strands 12 can be bent 14 or otherwise modified (and subsequently braided, roebelled and insulated) to form a stator coil 16. In one embodiment, the workpiece table assembly 10 advantageously comprises a table 18, a saddle 20, a lift mechanism 22, and a die 24. The saddle 20 is advantageously recessed below the table 18 and raised or lowered by the lift mechanism 22. The table 18 advantageously has a top surface 19 with holes 28 adapted to accept quick-release pins 30 from a step-off board 32. The step-off board 32 also has notches 34 to accept and position the strands 12 for die pressing.

In one exemplary operation, the step-off board 32 is used to stagger the strands 12 over the down-positioned saddle 20. The saddle 20 is then raised by the lift mechanism 22 and the die 24 placed on top of the strands 24. A force is applied to the die 24 to bend or otherwise modify the strands 12. Of course, several saddles 20 can be placed along the table 18 to bend several different portions of each strand 12, and other step-off boards 32 can be used to re-position and re-bend the same strands 12.

Figure 2:
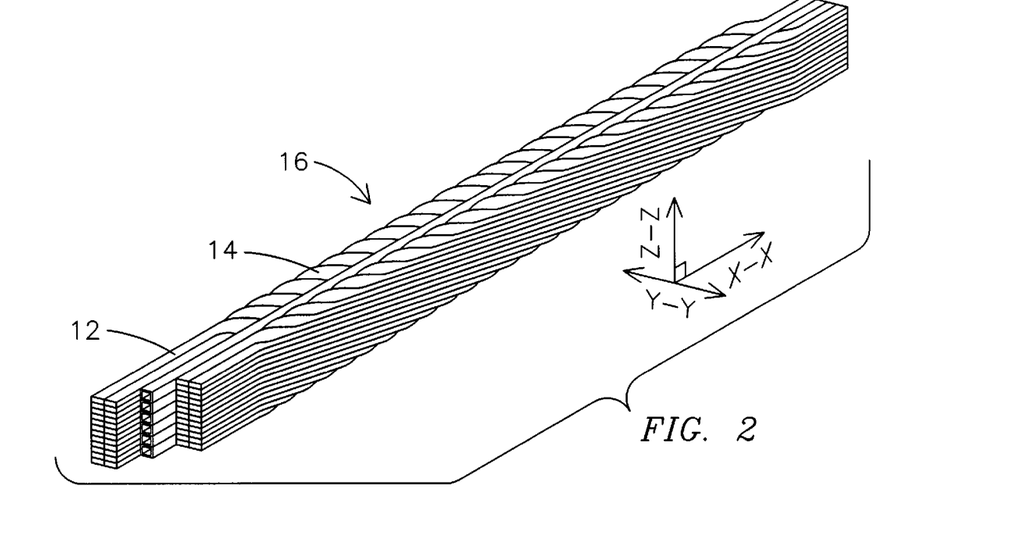
FIG. 2 is a side elevation view of an exemplary uninsulated stator coil capable of being arranged into the stator core slots.

To assist in the description of the invention described herein, the following terms are used. Referring to FIG. 2, a "longitudinal axis" (X—X) extends along the elongated length of the workpiece 12. A "lateral axis" (Y—Y) extends along the width of the workpiece 12. A transverse axis" (Z—Z) extends normal to both the longitudinal and lateral axes, and provides the third or height dimension of the workpiece 12. In addition, as used herein, the "longitudinal direction" or "longitudinal length" refers to a direction substantially parallel to the longitudinal axis, the "lateral direction" or "lateral length" refers to a direction substantially parallel to the lateral axis, and the "transverse direction" or "transverse length" refers to a direction substantially parallel to the transverse axis.

Figure 1:
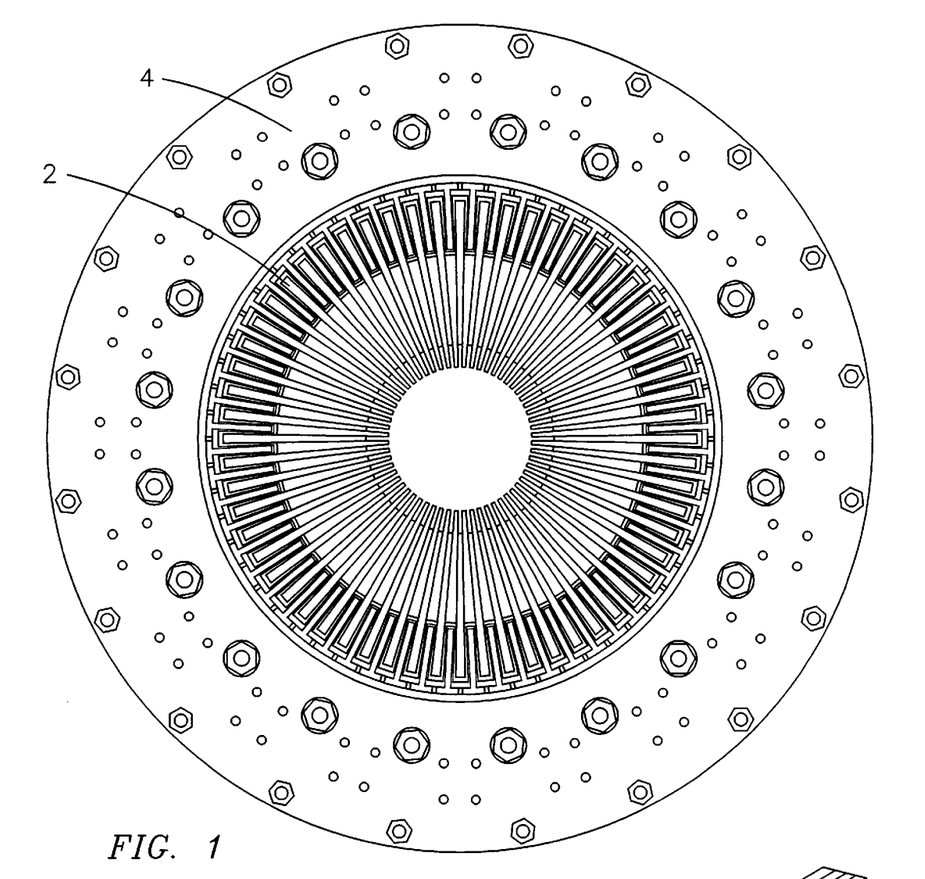
FIG. 1 is an end perspective view of an exemplary generator stator core, showing a plurality of stator core slots.

FIGS. 1 and 2 show an exemplary workpiece, illustrated as an uninsulated stator coil 16 or a conductive strand 12. The coil 16 is sized and configured to fit within axially extending slots 2 of the laminated stator core 4 of a generator (or vice-versa). Each coil 16 typically comprises a plurality (e.g. 5–100) of individual elongated conductive (e.g. copper) strands 12, each strand 12 having a length of about 5–40 feet and a perimeter of about 0.3–6 inches. The strands 12 are transposed along their longitudinal (X—X) length so that each strand 12 experiences a similar amount of flux within the slots 2 and thus carries a similar amount of electric current. Of course, the size, quantity and dimensions of the workpiece can be significantly (e.g. orders of magnitude) greater, less or different than that of the exemplary coil 16 or strand 12 when the teachings of the present invention are used in connection with applications outside of the exemplary stator coil manufacturing processes.

Figure 3:
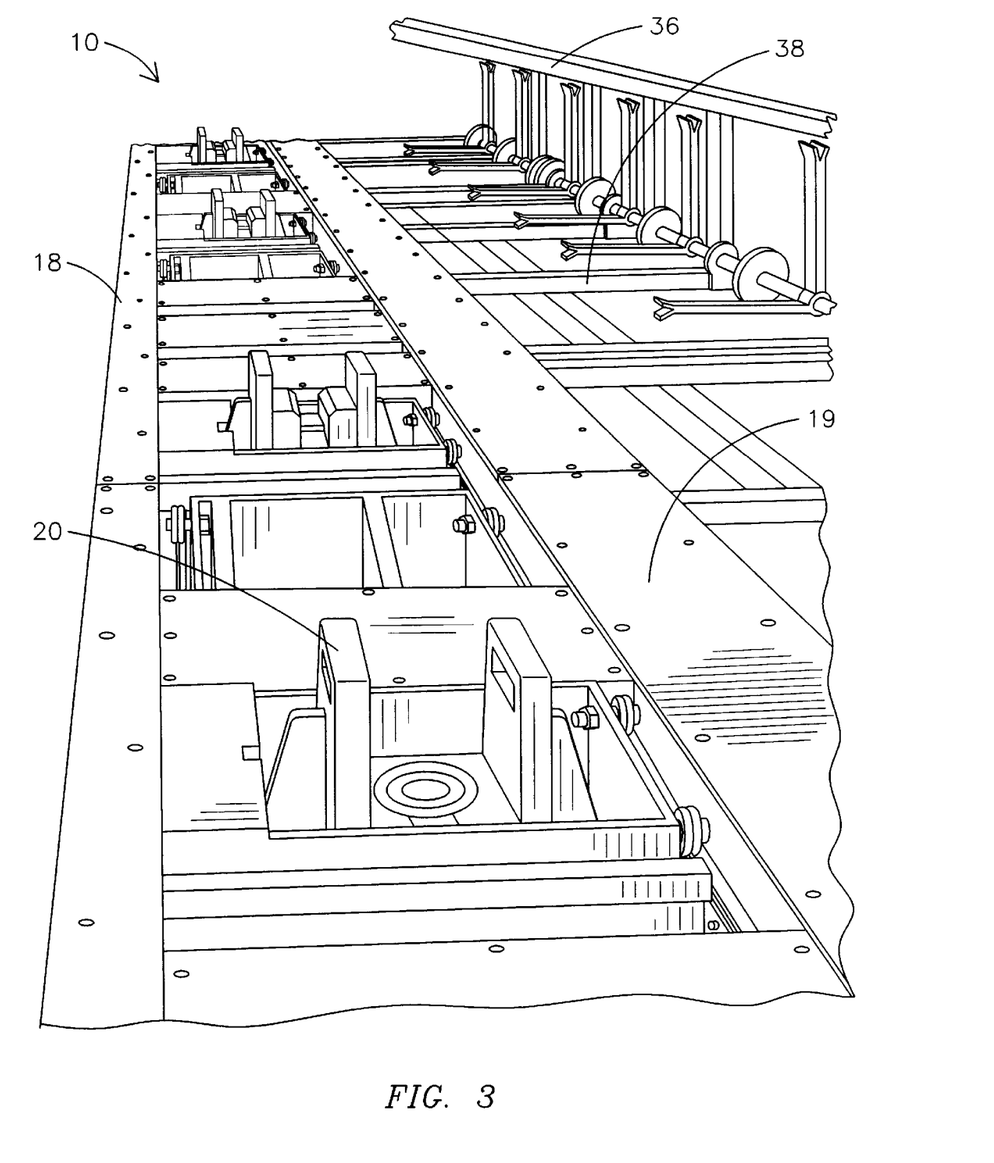
FIG. 3 is a perspective view of a workpiece table assembly of the present invention.

Referring to FIG. 3, a wire machine 36 (shown in part) forms the conductive strands 12 to the desired size and shape. Alternatively, strands 12 having the desired size and shape can be outsourced. The strands 12 are then moved by a conveyance system, such as a roller frame 38, or other means such as carts, overhead lifts, hand carried, etc. The conveyance system 38 may also collect, align or otherwise organize the strands 12 during their placement onto the table 18, to further improve assembly line efficiency.

Figure 4:
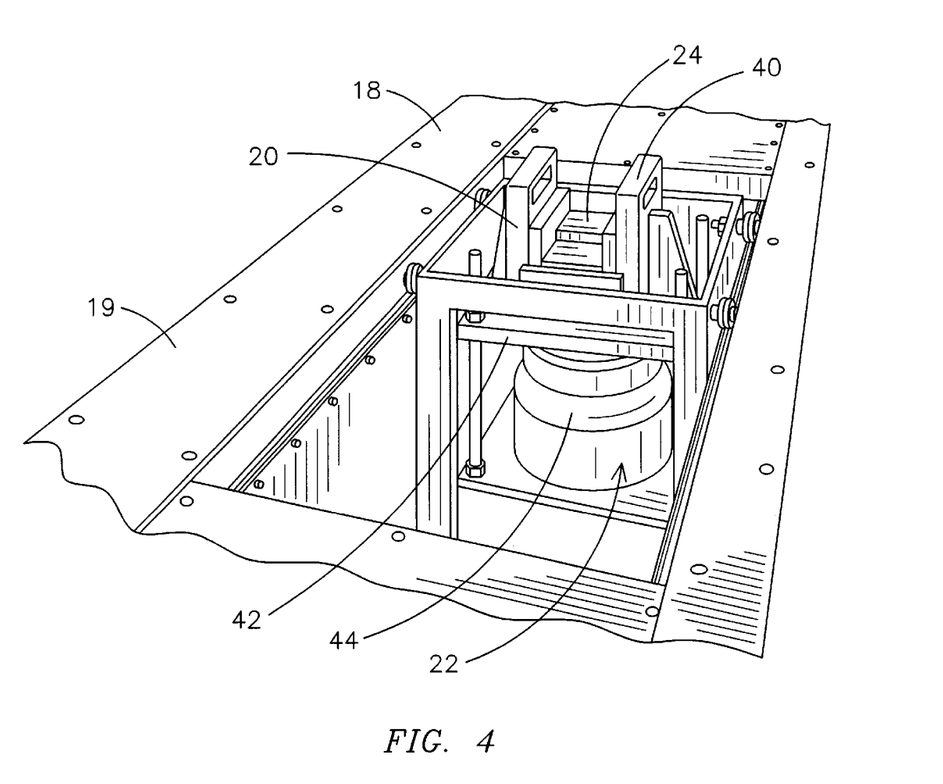
FIG. 4 is a perspective view of a portion of the workpiece table assembly of FIG. 3.
Figure 5:
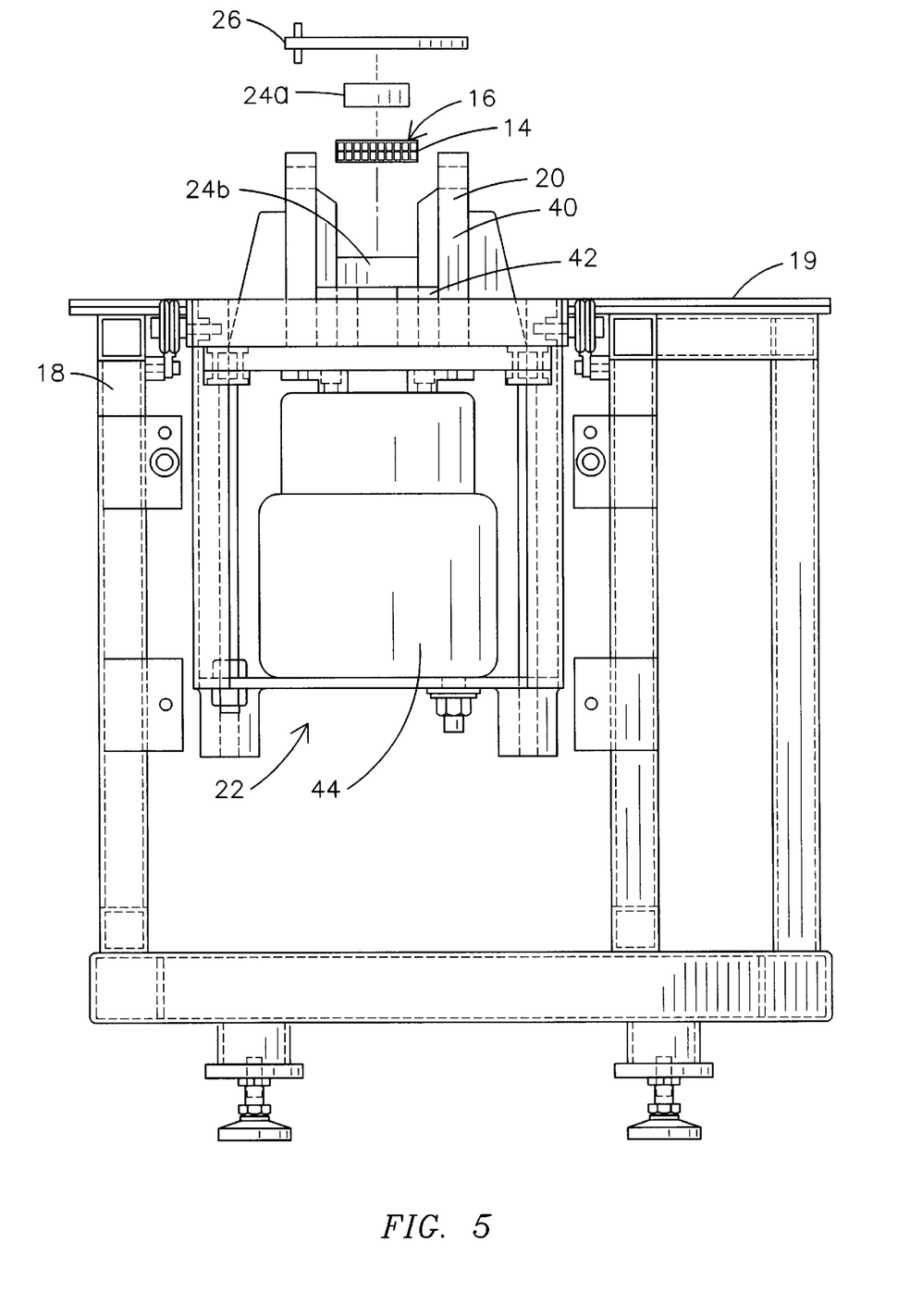
FIG. 5 is a side elevation view of a portion of the workpiece table assembly of FIG. 3.

Referring to FIGS. 3–5, the workpiece table assembly 10 is configured to support, hold, and/or bend or otherwise modify the strands 12. The workpiece table assembly 10 advantageously comprises a table 18, a saddle 20, a lift mechanism 22, and a die 24. The saddle 20 is advantageously recessed into the table 18 and raised or lowered by the lift mechanism 22. Such recessing allows the workpieces 12 to be placed onto the table 18 and over the saddle 20. The saddle 20 can be subsequently raised to elevate the workpieces 12 to a desired height in an efficient and worker-friendly manner. It has been found advantageous in some cases to elevate the workpiece 12 above the table 18 to increase the efficiency of the bending operation and to further improve workplace ergonomics. As illustrated, a plurality of axially arranged saddles 20 can be used to accommodate an elongated workpiece 12. Also, a plurality of otherwise arranged (e.g. angled, curved, concentric) saddles 20 can be used to accommodate workpieces of other sizes and shapes.

The saddle 20 provides a pressure resistant surface adapted to allow an applied force to be impressed upon the workpiece 12 when placed onto the saddle 20. The exemplary saddle 20 is generally cradle or U-shaped to hold a plurality (e.g. 5–100) of strands 12. However, depending on the number, size and shape of workpieces to be placed on the saddle 20, other shapes can be used, such as flat or bulbous. The lateral sides 40 and/or lower surface 42 of the saddle 20 can be made adjustable along any axis or length to further accommodate and secure the workpieces arranged on or within the saddle 20. The saddle 20 is advantageously constructed of a material capable of withstanding the rigors of assembly line manufacturing operations such as metal, high density plastic, composites and the like, with steel, aluminum or high-density plastic being preferred due to their strength, low cost and light weight.

Still referring to FIGS. 3–5, the lift mechanism 22 is operatively engaged with the saddle 20 to provide a means to raise and lower the saddle 20. The exemplary lift mechanism 20 has a bladder 44 positioned generally transversely (Z—Z) below the saddle 20 and selectively filled (to raise the saddle 20) or emptied (to lower the saddle 20) with air or other substances from a supply plenum. In context of the exemplary embodiment, an air pressure of about 2–20 pounds per square inch (psi) has been found suitable to raise and lower the saddle 20. Of course, other devices could be used to raise and lower the saddle such as hydraulic lifts, springs and the like.

The die 24 provides a negative of the modification to be impressed upon the workpiece 12. The modification can be any of a variety of impressible configurations, design or forms, such one or more bend, turn, cut, crimp, bevel, notch, impression, branding, pattern, artistic design and the like, with or without a particular geometry. The modification(s) to be impressed upon the workpiece 12, can be arranged at or along any location of the workpiece and have any level of detail. The die 24 may comprise any number of individual dies (e.g. typically 1–10) having at least a portion of the negative and positionable at a variety of locations relative to the saddle 20 and workpiece 12. In context of the exemplary embodiment, the die set 24 to comprises an upper die 24*a* housing the entire the negative since an upper die 24*a* is easily swappable during die 24 changeover operations and can from be desired bend. The exemplary embodiment also shows a lower die 24*b*.

Optionally, depending upon the configuration of the die 24 and saddle 20, a push mechanism 26 can be used to apply, disperse, help disperse or help more evenly disperse, the applied force to be placed upon the workpieces 12. The exemplary embodiment shows a push bar 26 that can be integrated with an automatic (e.g. hydraulic, air bladder, spring) or manual (e.g. hammer, mallet, anvil) force. The push bar 26 accepts and transfers the applied force onto the strands 12 and/or saddle 20.

Figure 6:
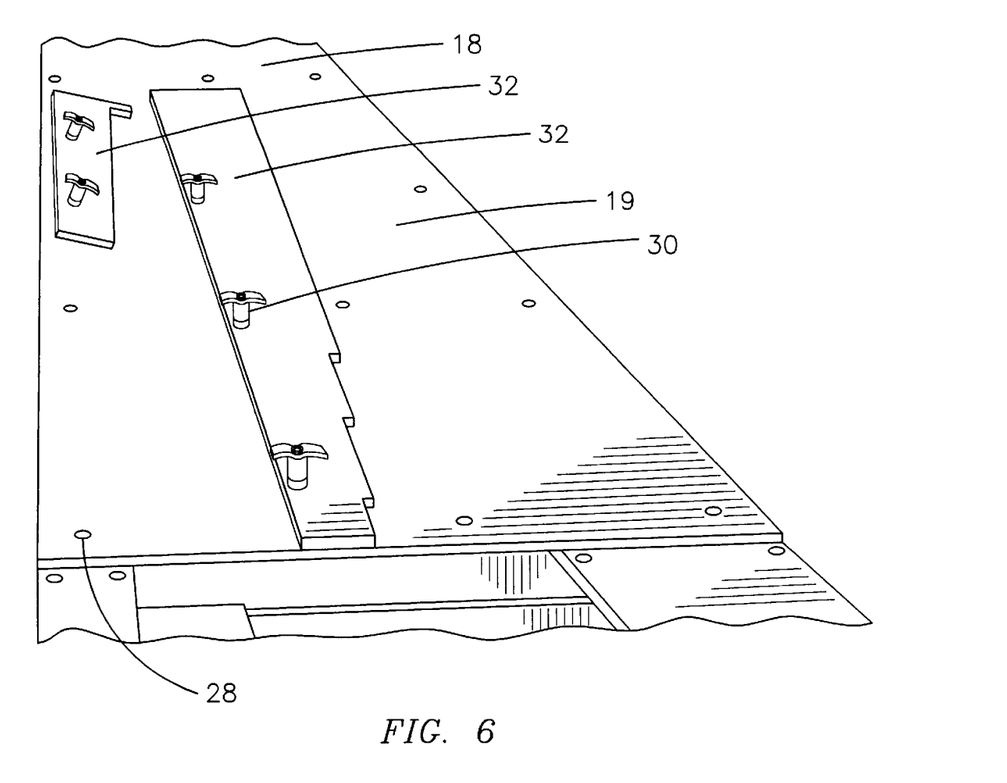
FIG. 6 is a side elevation view of a step-off board.
Figure 7:
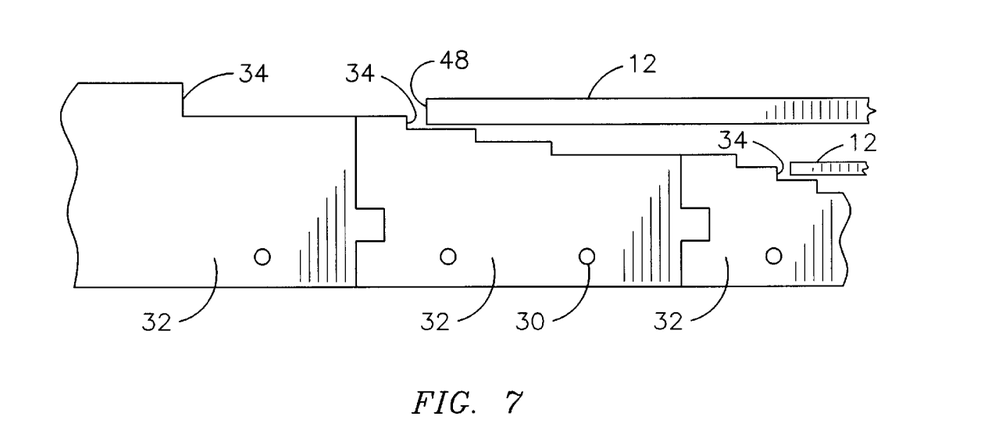
FIG. 7 is a perspective view of a plurality of interengaged step-off boards arranged on the workpiece table assembly.

Referring to FIGS. 6 and 7, the workpiece table assembly 10 advantageously further comprises a table 18 having an upper surface 19 with depressions 28, such as holes or grooves. The depressions 28 are adapted to accept mating protuberances 30, such as pins or rails, from a step-off board 32 for quick engagement and release between the table 18 and step-off board 32 to help increase assembly line efficiency. Alternatively, the depressions 28 can be formed on the step-off board 32 and the protuberances 30 can be formed on the table 18.

The step-off board 32 has at least one (e.g. 1–50) workpiece portion holder 34 sized and configured to hold or at least partially accept an end 48 or other portion of a strand 12. The illustrated embodiment shows the workpiece portion holder 34 as notches positioned at desired locations along the longitudinal (X—X) and lateral (Y—Y) lengths of the step-off board 32. Thus, an end 48 of a strand 12 can be arranged within a notch 34, an end 48 of another strand 12 can be arranged within another notch 34, and this successive end-within-a-notch pattern repeated so that each notch 34 has a strand end 48 therein. By this configuration, the strands 12 can be positioned in an offset or other arrangement, such as being staggered along their longitudinal (X—X) length (best shown in FIG. 7). This arrangement allows one laterally extending (Y—Y) die force across the staggered longitudinally (X—X) extending strands 12 to bend 14 the strands 12 at different longitudinal (X—X) locations along the strands 12. Alternatively, if a staggered bend 14 is desired, the die 24 can be formed with a staggered negative orientation and the ends 48 of the strands 12 arranged flush, with the portions of the strands 12 to be bent then placed into or onto the staggered die 24.

Also, the step-off board 32 can have a modular or jigsaw puzzle configuration such that several step-off boards 32 can be assembled together and thus mixed and matched to provide for a wide variety of strand 12 staggering or spacing configurations. Additionally, the strands 12 can be axially or otherwise adjusted to place bends 14 generally along a lateral (Y—Y) or transverse (Z—Z) axes, in addition to or instead of placing the bends 14 generally along a longitudinal (X—X) axis.

Referring back to FIG. 3, in an advantageous strand 12 bending operation, the conductive strands 12 are formed to a desired length and then laid on the table 18 in a set of about 5–40 strands 12. The ends 48 of the strands 12 are then longitudinally (X—X) staggered by placing them into the spaced apart notches 34 in the step-off board 32 (the step-off board 32 being mated to the table 18 as described above). The strands 12 are then loaded into the down-positioned saddle 20, the saddle 20 raised, and the top die 24*a* placed over the saddle 20 and/or strands 12. Next, an applied force is directed onto the strands 12, die 24 and/or push mechanism 26 to bend the strands 12 at the desired longitudinally (X—X) staggered locations.

Optionally, the strands 12 could be rearranged with the same or different step-off boards 32, reloaded into the saddle 20, and further bent or modified. In a preferred embodiment, the bending process is performed several (e.g. 2–10) times per strand 12 so that each strand 12 has multiple bend locations. The multiple bend locations can be performed simultaneously with several saddles 20 or successively with one saddle 20.

Figure 8:
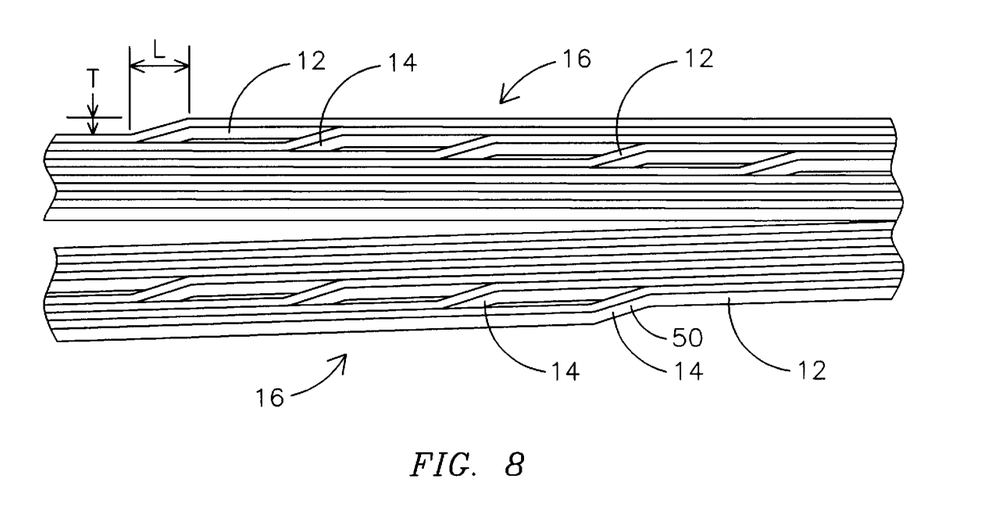
FIG. 8 is a side elevation view of a plurality of modified workpieces.

A preferred bend 14 has a longitudinal (X—X) length L of about 0.2–6 inches, a transverse (Z—Z) length T of about 0.1–4 inches, and at least one curved, linear or curvilinear portion 50. Another preferred strand bend 14 has a longitudinal (X—X) length L of about 0.2–4 inches, a transverse (Z—Z) length T of about 0.1–2 inches, a lateral (Y—Y) length of about 0.1–2 inches, and at least three curved, linear or curvilinear portions 50.

A preferred strand 12 for use in a stator coil 16 has about 2–10 bends 14 along its longitudinal (X—X) length, with the bends 14 being either uniformly or nonuniformly spaced. Another preferred strand 12 for use in a stator coil 16 has five bends 14 along its longitudinal (X—X) length, with the spacing between the first and second bend the same as the spacing between the fourth and fifth bend, and the spacing between the second and third bend the same as the spacing between the fourth and fifth bend. Another preferred strand 12 for use in a stator coil 16 has five bends 14 along its longitudinal (X—X) length, with the size and shape of the first bend 14 the same as the size and shape of the fifth bend 14, and the size and shape of the second bend 14 the same as the size and shape of the fourth bend 14.

One way to form a stator coil 16 for use in the contextual power generation operation comprises braiding a plurality (e.g. 2–5) of groups of about 5–40 strands 12, and then transposing and insulating the braided strands 12, as will be understood by one skilled in the art. One skilled in the art will understand that the stator coil 16 can be prepared in many other ways. In a preferred coil 16 configuration, each braided strand 12 has about 2–10 bends 14 along a 720° longitudinal (X—X) length of the coil 16. In another preferred coil 16 configuration, each braided strand 12 has about 2–10 bends 14 along a 540° longitudinal (X—X) length of the coil 16. In another preferred coil 16 configuration, each braided strand 12 has 5 bends 14 along a 720° longitudinal (X—X) length of the coil 16.

By the above-described workpiece table assembly 10, workpiece 14 modification process, apparatus and method, several advantages become apparent. For example, the reduction of the amount of time required: to place the strands 12 onto the table 18, to offset the strands 12, to load the strands 12 into and out of the saddle 20, and to changeover from one bend 14 configuration to another. For another example, the reduction in the amount of physical effort required to load and unload the strands 12 into and out of the saddle 20 (each strand 14 typically weighing about 1–10 pounds). Otherwise, this heavy lifting requires several strong workers or the assistance of lifting tools. For another example, the improved offset alignment of bends 14 through use of the step-off board 32. Misaligned stator coil 16 bends 14 are particularly disadvantageous because once the stator coils 16 are placed into the stator core 4 slots 2 and the rotor is sleeved within the stator core 4, it is difficult to access the stator coils 16 for repair or replacement.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A workpiece table assembly, comprising:
   a table having a surface adapted to support at least one workpiece;
   a unitary saddle adapted to be movable between a first position and a second position, the first position having at least a portion of the saddle recessed below the surface of the table and the second position having at least a portion of the saddle raised above the surface of the table, the saddle further adapted to hold at least a portion of the workpiece within the saddle;
   a die adapted to apply a pressure onto the workpiece within the paddle sufficient to modify the workpiece; and
   a step-off board having at least one workpiece portion holder positioned at a desired location along the step-off board, each workpiece portion holder sized and configured to at least partially accept a portion of the workpiece and position the workpiece on the table.

2. The assembly of claim 1, further comprising a wire machine adapted to form a plurality of elongated wire workpieces having a length of at least five feet.

3. The assembly of claim 2, further comprising a roller frame assembly disposed between the table and the wire machine adapted to move the workpieces from the wire machine to the table.

4. The assembly of claim 1, wherein the table further comprises a plurality of depressions, each depression sized and configured to accept a protuberance of the step-off board.

5. The assembly of claim 1, wherein the saddle is U-shaped to hold a plurality of workpieces.

6. The assembly of claim 5, wherein at least one portion of the saddle is adjustable to accommodate or secure the workpieces.

7. The assembly of claim 1, wherein the saddle is moveable between the first position and the second position by a lift mechanism comprising an air-inflatable bladder.

8. The assembly of claim 1, wherein the die comprises an upper die having at least a portion of a negative of the modification to be made to the workpiece.

9. The assembly of claim 1, wherein the modification is selected from the group consisting of a bend, turn, cut, crimp, bevel, notch, impression, branding, artistic design, pattern and the like.

10. The assembly of claim 1, wherein the step-off board has a plurality of pins, each pin adapted to make a quick-release fit with a hole in the table.

11. The assembly of claim 1, wherein the workpiece holder portion of the step-off board comprises a notch adapted to accept an end of the workpiece.

12. The assembly of claim 1, wherein the step-off board allows one laterally extending die force across the workpiece to bend the workpiece at offset longitudinal locations along the workpiece.

13. The assembly of claim 1, wherein the workpiece is a conductive strand having a perimeter of about 0.3–6 inches for use in a generator stator.

14. The assembly of claim 13, wherein the strand is modified by forming a bend on the strand.

15. The assembly of claim 1, wherein the modification has a longitudinal length of about 0.2–6 inches, a transverse length of about 0.1–4 inches, and at least one curved, linear or curvilinear portion.

16. The assembly of claim 1, wherein the workpiece is a conductive strand and the modification is a bend.

17. The assembly of claim 16, wherein the bend has a longitudinal length of about 0.2–6 inches, a transverse length of about 0.1–4 inches, and at least one curved, linear or curvilinear portion.

18. The assembly of claim 16, wherein five bends are arranged along the longitudinal length of each strand, with the spacing between the first and second bend the same as the spacing between the fourth and fifth bend and the spacing between the second and third bend the same as the spacing between the fourth and fifth bend, and the size and shape of the first bend the same as the size and shape of the fifth bend and the size and shape of the second bend the same as the size and shape of the fourth bend.

19. A workpiece table assembly, comprising:
   a table having a surface adapted to support at least one workpiece and having a plurality of table mating elements;
   a saddle adapted to be movable between a first position and a second position, the first position having at least a portion of the saddle recessed below the surface of the table and the second position having at least a portion of the saddle raised above the surface of the table, the saddle further adapted to hold the workpiece within the saddle;
   a die adapted to apply a pressure onto the workpiece within the saddle sufficient to modify the workpiece; and
   a step-off board having at least one workpiece portion holder positioned at a desired location along the step-off board, each workpiece portion holder sized and configured to at least partially accept a portion of the workpiece and position the workpiece on the table, and the step-off board having a plurality of step-off board mating elements sized and configured to mate with the table mating elements.

20. The assembly of claim 19, wherein the workpiece is a conductive strand having a perimeter of about 0.3–6 inches for use in a generator stator, and the modification is selected from the group consisting of a bend, turn, cut, crimp, bevel, notch, impression, branding, artistic design, pattern and the like.

21. The assembly of claim 20, wherein the modification is a bend having a longitudinal length of about 0.2–6 inches, a transverse length of about 0.1–4 inches, and at least one curved, linear or curvilinear portion.

22. The assembly of claim 21, wherein five bends are arranged along the longitudinal length of each strand, with the spacing between the first and second bend the same as the spacing between the fourth and fifth bend and the spacing between the second and third bend the same as the spacing between the fourth and fifth bend, and the size and shape of the first bend the same as the size and shape of the fifth bend and the size and shape of the second bend the same as the size and shape of the fourth bend.

23. A workpiece table assembly, comprising:
   a table having a surface adapted to support at least one workpiece;
   a saddle adapted to be movable between a first position and a second position, the first position having at least a portion of the saddle recessed below the surface of the table and the second position having at least a portion of the saddle raised above the surface of the table, the saddle further adapted to hold at least a portion the workpiece within the saddle;
   a die adapted to apply a pressure onto the workpiece within the saddle sufficient to modify the workpiece; and
   a step-off board having a plurality of workpiece portion holders positioned at different locations along the step-off board, each workpiece portion holder sized and configured to at least partially accept a portion of the workpiece and position the workpiece at a different location on the table.

24. The assembly of claim 23, wherein the workpiece is a conductive strand having a perimeter of about 0.3–6 inches for use in a generator stator, and the modification is selected from the group consisting of a bend, turn, cut, crimp, bevel, notch, impression, branding, artistic design, pattern and the like.

25. The assembly of claim 24, wherein the modification is a bend having a longitudinal length of about 0.2–6 inches, a transverse length of about 0.1–4 inches, and at least one curved, linear or curvilinear portion.

26. The assembly of claim 25, wherein five bends are arranged along the longitudinal length of each strand, with the spacing between the first and second bend the same as the spacing between the fourth and fifth bend and the spacing between the second and third bend the same as the spacing between the fourth and fifth bend, and the size and shape of the first bend the same as the size and shape of the fifth bend and the size and shape of the second bend the same as the size and shape of the fourth bend.

* * * * *